(12) United States Patent
Marisy et al.

(10) Patent No.: US 7,886,896 B2
(45) Date of Patent: Feb. 15, 2011

(54) METHOD OF CONTROLLING THE TENSION OF A BIN CAROUSEL CHAIN

(75) Inventors: Stephane Marisy, Bourg les Valence (FR); Bruno Leopold, Malissard (FR); Dominique Decharran, Bourg les Valence (FR); Alain Danjaume, Besayes (FR)

(73) Assignee: Solystic, Gentilly Cedex (FR)

( * ) Notice: Subject to any disclaimer, the term of this patent is extended or adjusted under 35 U.S.C. 154(b) by 612 days.

(21) Appl. No.: 11/912,822

(22) PCT Filed: Jul. 2, 2007

(86) PCT No.: PCT/FR2007/051575
§ 371 (c)(1),
(2), (4) Date: Oct. 26, 2007

(87) PCT Pub. No.: WO2008/020136
PCT Pub. Date: Feb. 21, 2008

(65) Prior Publication Data
US 2009/0301843 A1    Dec. 10, 2009

(30) Foreign Application Priority Data
Aug. 3, 2006    (FR) .................................. 06 53271

(51) Int. Cl.
*G01N 29/00*    (2006.01)
(52) U.S. Cl. .............................. 198/810.04; 198/502.1; 73/828; 474/102
(58) Field of Classification Search .............. 198/502.1, 198/701, 813, 810.04; 73/828; 474/102, 474/105, 106
See application file for complete search history.

(56) References Cited

U.S. PATENT DOCUMENTS

| 5,502,293 | A | * | 3/1996 | Ohnishi et al. ............... 219/543 |
| 5,641,058 | A | * | 6/1997 | Merten et al. ........... 198/810.04 |
| 6,029,799 | A | * | 2/2000 | Weigel et al. ........... 198/810.04 |
| 6,137,974 | A | * | 10/2000 | Williams et al. ............. 399/165 |
| 6,435,035 | B1 | * | 8/2002 | Kubsik et al. .................. 73/828 |
| 6,802,414 | B2 | * | 10/2004 | Buhne ......................... 198/813 |
| 6,834,228 | B2 | * | 12/2004 | Serkh et al. .................. 701/115 |
| 7,117,989 | B2 | * | 10/2006 | Weigel et al. ........... 198/810.04 |
| 7,729,994 | B2 | * | 6/2010 | Gupta et al. .................. 705/65 |
| 7,793,775 | B2 | * | 9/2010 | Rozenfeld et al. ...... 198/810.03 |

FOREIGN PATENT DOCUMENTS

EP    1 222 036 B1    4/2006

* cited by examiner

*Primary Examiner*—Douglas A Hess
(74) *Attorney, Agent, or Firm*—Rothwell, Figg, Ernst & Manbeck, p.c.

(57) ABSTRACT

A method of monitoring the tension of a continuous endless drive elongate member mounted to be moved over a closed-loop path and having a slack run along which it forms undulations, said method consisting in placing a sensor along said slack run for detecting undulations going past in the slack run, and in counting the number of undulations detected, said number serving as a magnitude for measuring the tension of the drive member.

10 Claims, 3 Drawing Sheets

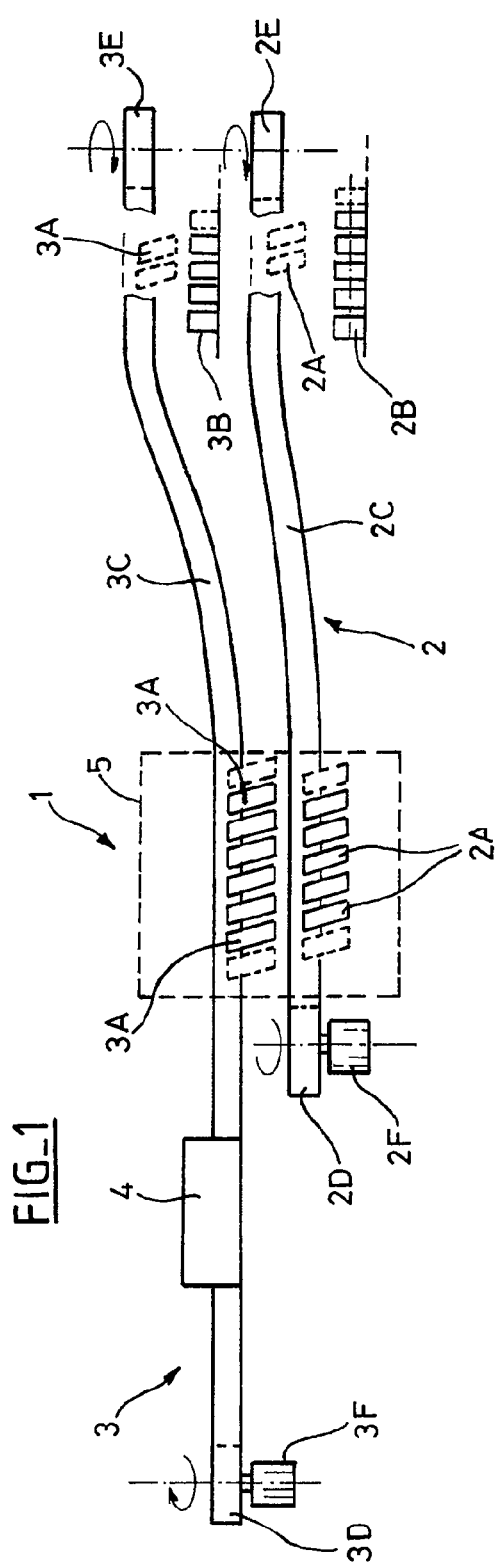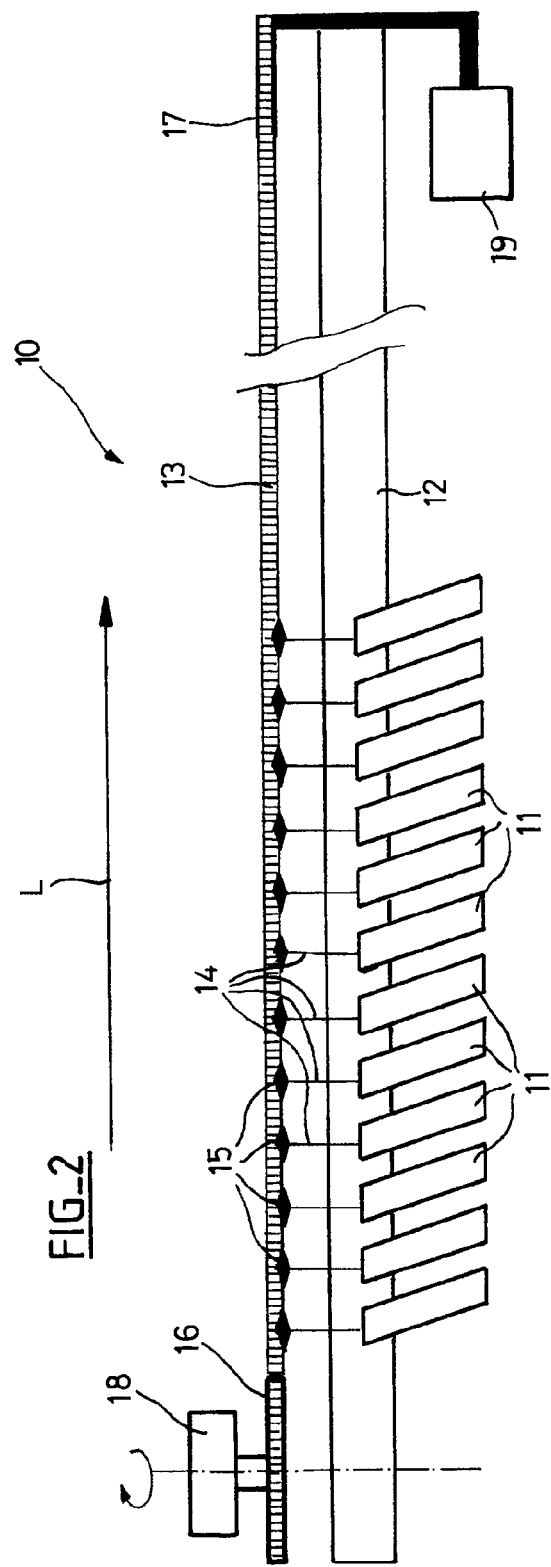

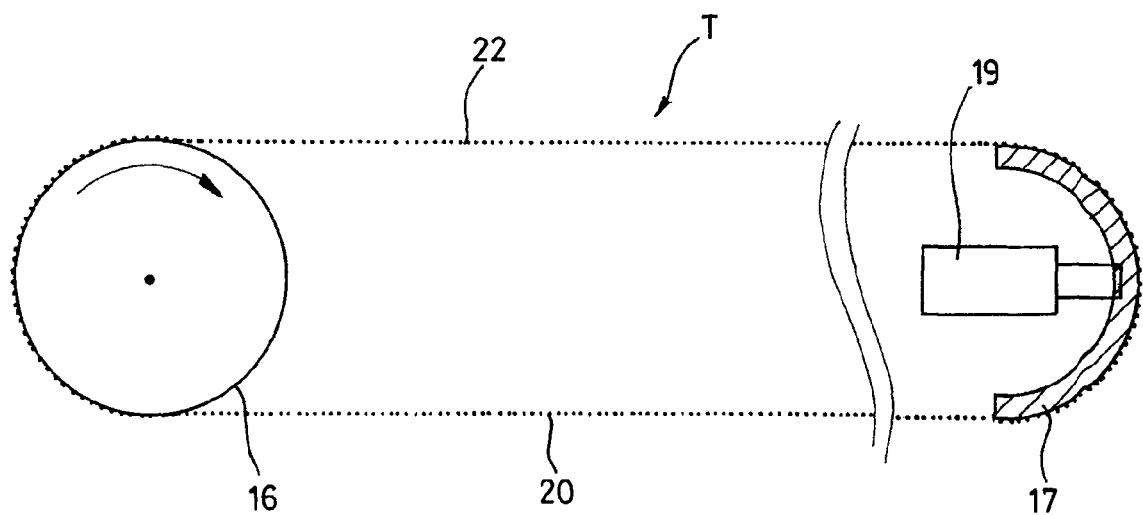
FIG_3
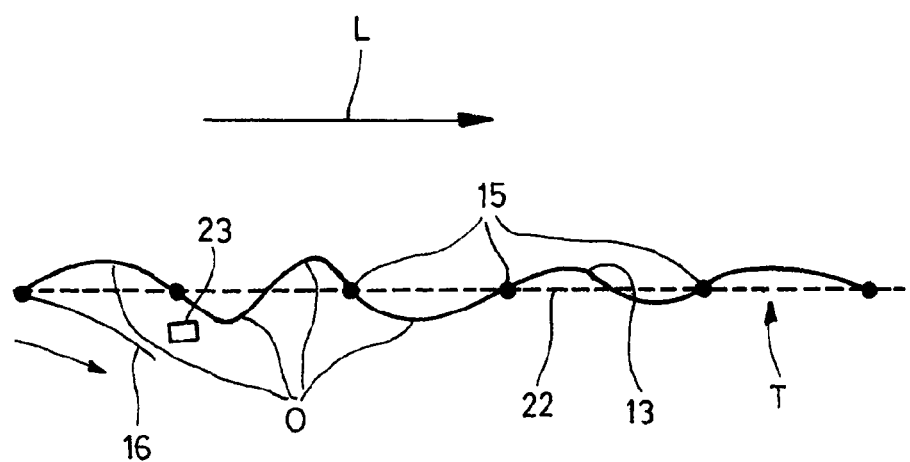
FIG_4

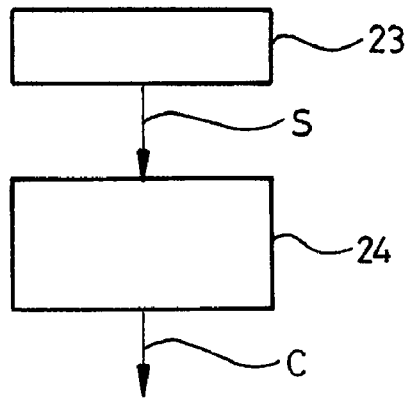
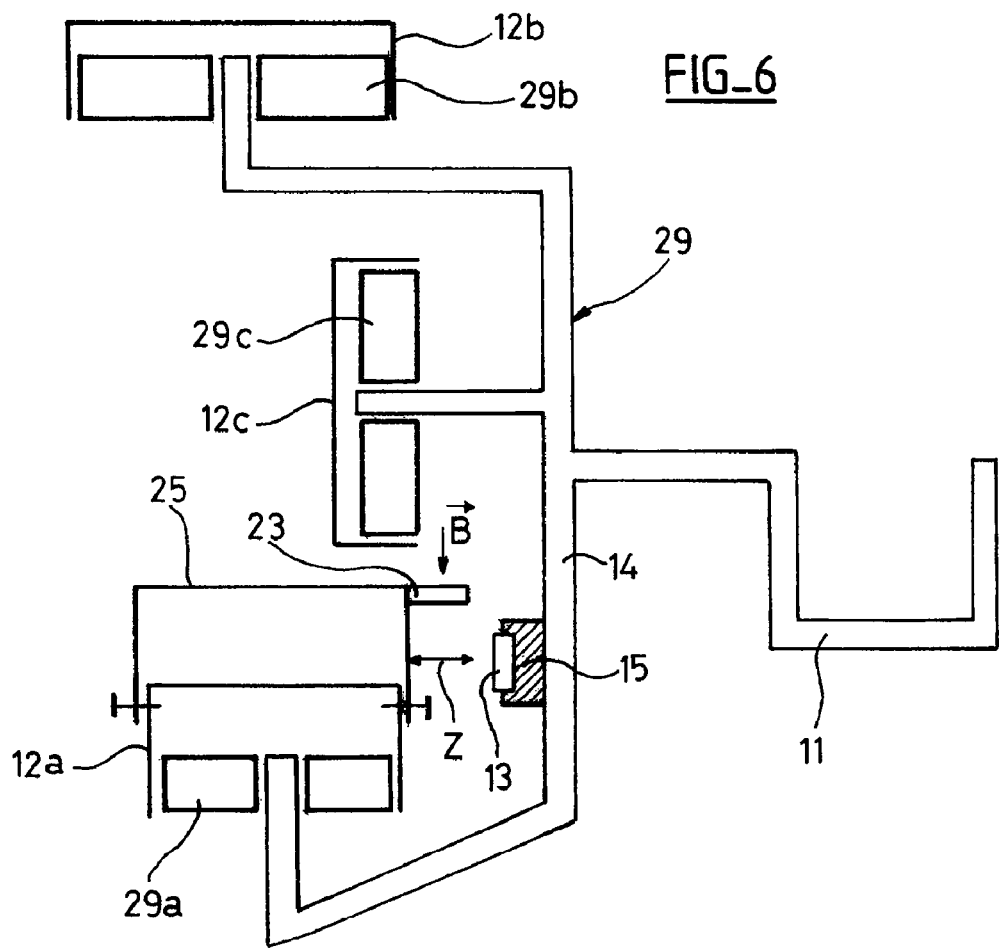

US 7,886,896 B2

METHOD OF CONTROLLING THE TENSION OF A BIN CAROUSEL CHAIN

CROSS REFERENCE TO RELATED APPLICATIONS

This application is a 35 U.S.C. §371 National Phase Application from PCT/FR2007/051575, filed Jul. 2, 2007, and designating the United States, which claims the benefit of France Patent Application No. 0653271, filed Aug. 3, 2006.

BACKGROUND OF THE INVENTION

1. Field of the Invention

The invention relates to a method of monitoring the tension of a continuous endless drive elongate member mounted to be moved over a closed-loop path and having a slack run along which it forms undulations.

The invention applies more particularly to a mail handling machine having one or more bin carrousels whose bins are driven to move around a closed-loop path via a drive chain, e.g. an endless roller chain, or indeed a cable or a belt.

2. Discussion of the Background Art

Such a mail handling machine that more particularly has two superposed bin carrousels is known, for example, from European Patent Document EP 1 222 036 and is shown in FIG. 1.

In FIG. 1, the mail handling machine thus has a bottom conveyor or carrousel 2 made up of bins 2A mounted to be moved along a first closed-loop path, and a top conveyor or carrousel 3 made up of bins 3A mounted to be moved along a second closed-loop path that is superposed on the first path.

The two bin paths extend in planes that are substantially horizontal. The carrousel 2 serves first sorting outlets constituted by trays such as 2B disposed on a first horizontal level, and the carrousel 3 serves second sorting outlets constituted by trays such as 3B disposed on a second horizontal level situated above the first sorting outlet level.

FIG. 1 shows a small number of bins 2A, 3A and of trays 2B, 3B, but it should be understood that the bins are distributed over the entire length of the bin path. Carrousels having 200 or 350 bins are common in mail handling machines.

As shown in FIG. 1, the bins 2A of the carrousel 2 are slidably guided along their closed-loop path by a system of rails 2C. In particular, each bin 2A is provided with a structure having a plurality of bearing rollers that are mounted to move in a plurality of rails of the system of rails 2C. The roller structure is coupled to an endless drive chain (not shown in FIG. 1) which is engaged over a cog pulley 2D driven in rotation by a motor 2F and which is also engaged over a chain return and tensioning pulley 2E.

The bins 3A of the carrousel 3 are also guided by another system of rails 3C and are coupled to another endless drive chain (not shown) which is engaged over the cog wheel 3D driven in rotation by the motor 3F and over the chain return and tensioning pulley 3E.

The machine shown in FIG. 1 is fed with letters or with other flat items via one or more inlet branches such as 4 which inject the flat items into the bins 3A of the top carrousel 3 only. If flat items are for sorting to a sorting outlet served by the bottom conveyor 2, such flat items are transferred from a bin 3A of the conveyor 3 to a bin 2A of the bottom conveyor 2 via a transfer zone 5. In said transfer zone, the movements of the bins 2A and 3A of the conveyors 2 and 3 are synchronized by an electric shaft. In the transfer zone 5, the bins 2A and 3A of the two conveyors follow parallel paths that are very close together in a vertical plane so as to enable a flat item contained in a bin 3A to be transferred to a bin 2A merely by gravity.

In such a mail handling machine as described above, it is necessary for the two drive chains of the carrousels 2 and 3 to continue to have appropriate tension over time. It is therefore necessary to check frequently the tension of the chains since an over-tensioned chain might be damaged under forces that are too large, and an under-tensioned chain might give rise to the bins being damaged by them hitting one another.

Such checking is usually performed by visual inspection. For that purpose, an operator climbs onto the top portion of the casing of machine, opens one or more covers in the casing of the machine, and observes the two chains. In particular, the operator observes the extent to which chains are "weaving" or "floating", but such inspection is approximate because it depends on the opinion of the operator.

In addition, since the inspection must be performed while the machine is operating, there exists a non-negligible risk of accident for the operator, who has to lean into the casing of the machine to come close enough to the chains while said chains are moving.

Finally, the chains are not inspected frequently enough to mitigate any risk of a chain breaking, due, for example, to the chain becoming rapidly over-tensioned.

In certain technical fields different from mail handling, systems are known for automatically checking the tension of an endless drive chain.

For example, Patent Document DE 3 927 892 discloses a device making it possible to check the tension of an endless drive chain, whereby pressure is exerted on the chain perpendicularly to the direction of movement of said chain, and values of reaction to the pressure are compared with known limit values.

Such checking is impossible on a drive chain of a bin carrousel of a postal sorting machine due to the presence of the bins coupled to the chain.

Patent Document DE 3 502 664 also discloses a device making it possible to check the tension of a drive chain by means of a plurality of force sensors associated with the pulleys over which the chain is engaged. Such an installation is very complex and costly to implement.

Patent Document U.S. Pat. No. 5,641,058 also discloses a method of performing continuous and real-time monitoring for checking the tension of a chain engaged over two cog pulleys by measuring the force exerted by hydraulic actuators for keeping the two pulleys a certain distance apart. That method is not suitable for the length of a drive chain of a bin carrousel of a postal sorting machine.

SUMMARY OF THE INVENTION

An object of the invention is to propose another method of monitoring the tension of an endless drive chain in a bin carrousel for a postal sorting machine.

In particular, an object of the invention is to propose such a method that enables the tension of the chain to be monitored continuously.

Another object of the invention is to propose such a method that is simple and inexpensive to implement.

To these ends, the invention provides a method of monitoring the tension of a continuous endless drive elongate member mounted to be moved over a closed-loop path and having a slack run along which it forms undulations, said method being characterized in that it consists in placing a sensor on said closed-loop path for detecting undulations going past in the slack run, and in counting the number of undulations detected by the sensor, said number of counted undulations serving as a magnitude for measuring the tension of the drive member.

The idea of the invention is thus based on the fact that the number of undulations that form on the slack run of a chain is representative of the tension of the chain. Within certain limits, the more the chain is relaxed, the higher the number of undulations that form. Since said undulations are generated in the vicinity of the drive cog wheel and since they die out in the vicinity of the return guide, the undulations going past are detected where they are of maximum amplitude, i.e. in the vicinity of and downstream from the drive cog pulley.

In the method of the invention, a contactless sensor is used to detect the undulations going past in the slack run, e.g. an inductive sensor, an optical sensor, or the like so that monitoring the tension of a bin carrousel drive chain is independent of the length of the chain. For the inductive sensor, it is possible to use the sensor called "IFFM 20P17A3" sold by "Baumer", that sensor being quite compact so that it is easy to accommodate in the cramped spaces of a bin carrousel.

The invention also provides a mail handling machine having a bin carrousel whose bins are driven to move around a closed-loop path via an endless drive chain having a slack run along which the chain forms undulations, said machine being characterized in that it includes a system suitable for detecting undulations going past in the slack run of the chain, and in counting the number of detected undulations for the purpose of monitoring the tension of the chain.

According to the invention, said machine may have the following features:

- the system comprises an inductive sensor or an optical sensor placed on a guide rail for guiding the bins for the purpose of detecting undulations going past in the slack run of the chain;
- the system further comprises a data-processing unit that compares the number of undulations counted over a given period of time with a reference value so as to deliver an alarm or adjustment control signal; and
- said data-processing unit is programmed to repeat the comparison operation cyclically.

In the invention, the term "endless drive elongate member" that is "mounted to be moved over a closed-loop path" is not limited to a chain, but rather it covers any type of endless elongate member used in transmitting motion and drive for moving baskets, pods, or the like for conveying people or objects, such as, for example, a cable, a belt, or the like.

BRIEF DESCRIPTION OF THE DRAWINGS

The invention can be better understood on reading the following description and on examining the accompanying figures. The description is given merely by way of non-limiting indication of the invention. In the figures:

FIG. 1 is an overall diagrammatic view of a prior art postal sorting machine having two carrousels;

FIG. 2 is a diagrammatic side view of a bin carrousel of a mail handling machine of the invention;

FIG. 3 is a diagrammatic plan view of the path of the fastening calipers for fastening the bin bearing and guide structures to the drive chain; and FIG. 4 is a plan view of the slack run of a chain, along which run undulations form;

FIG. 5 is a flow chart showing the various steps in monitoring the tension of the chain; and FIG. 6 is a diagrammatic cross-section of a bin and of its bearing and guide structure arranged on a system of rails, and of an inductive sensor.

DETAILED DESCRIPTION OF THE PREFERRED EMBODIMENTS

The method of the invention can be implemented in a mail handling machine that is analogous to the mail handling machine shown in FIG. 1 and described in Patent Document EP 1 222 036 and applies more particularly to devices having a closed-loop chain driven to be moved at a single point.

In order to simplify the description of the invention, a single bin carrousel of a mail handling (postal sorting) machine is shown in FIG. 2. The carrousel 10 comprises bins 11 for conveying postal items.

The bins 11 move around a path forming a closed loop. Each of the bins 11 has a roller bearing and guide system that is mounted to move in a system of rails 12 in the direction L. The roller system is drivingly coupled, so that it moves in direction L, to an endless chain 13, e.g. a roller chain, via a hanger arm 14 and via a fastening caliper 15 represented by a diamond-shape in FIG. 2. In practice, the bins 11 of the carrousel are distributed at a uniform distance apart over the entire length of the chain 13, i.e. the fastening calipers 15 for fastening the bins to the chain are spaced apart by a length of a few tens of centimeters (cm), and more particularly by 285 millimeters (mm).

In this example, the drive chain 13 is engaged over a first cog pulley 16, and over a return runner 17 (or a return second cog pulley) placed remote from the first pulley 16. The pulley 16 is motor driven at 18 and the return runner 17 is provided with a system 19 for adjusting the tension of the chain.

FIG. 3 shows the tensioned run 20 of the chain and the slack run 22 of the chain along the closed-loop path T. By way of example, in a bin carrousel of a postal sorting machine, the length of a run of the path T is about 60 meters for a loop width of 2 meters.

The drive chain 13 is more particularly a chain having rollers and flat links, which flat links extend in the plane of FIG. 3. On leaving the pulley 16, undulations form in the slack run 22. Said undulations are thus formed in the plane of FIG. 3, i.e., in practice, in the horizontal plane.

FIG. 4 shows the undulations O formed on the slack run 22 of the chain 13. In particular, it shows undulations that form between the fastening calipers 15 immediately downstream from the motor-driven pulley 16. These undulations tend to die out going downstream in the direction L of movement of the chain 13. FIG. 4 shows, in dashed lines, the path T that is followed by the roller systems of the bins 11 in the rails 12 (and thus of the calipers 15)

The undulations normally oscillate on either side of said path T as shown in FIG. 4 between two fastening calipers 15 but it is not impossible for the chain 13 on the slack run to form sort of undulations to one side only of the path T. It should be understood that, as the endless chain 13 moves in the direction L, undulations form, move in the direction L, and disappear on reaching the vicinity of the return runner 17.

In accordance with the invention, a contactless sensor 23 is disposed along the path T at the slack run of the chain 13 in order to detect undulations 9 going past.

Said sensor 23 can be an inductive sensor or a ferromagnetic induction sensor that emits a magnetic field and that sends back a signal when the magnetic field is disturbed. In practice, as shown in FIG. 4, the sensor 23 is disposed in a manner such that it is offset relative to the path T so that the undulations O of the chain 13 pass through the magnetic field that it emits. When an undulation O passes through the magnetic field of the sensor 23 in the direction L, it generates magnetic interference that is detected by the sensor 23 which then delivers a corresponding outlet signal. In practice, the maximum amplitude of the undulations (perpendicularly to the direction L) is a few centimeters, and it is possible, for example, to offset the sensor 23 by 2 cm off the path T.

Naturally, other contactless sensors can also be used such as, for example, an optical sensor.

As shown in FIG. 5, the outlet signal S of the sensor 23 is sent to a data-processing unit 24 that counts the number of occurrences of detection within a given period of time. This counting can be performed cyclically by the unit 24 so that the tension of the chain can be monitored almost continuously. In the unit 24, the number of occurrences counted in an (adjustable) period of time is compared with a reference value. The comparison can then be continued by the unit 24 sending an alarm signal C, for example, or indeed a control signal for the tension adjustment system 19.

The reference value can be a number of occurrences counted with a chain 13 having the required tension characteristics. Counting in the unit 24 consists, for example, in comparing the reference value with the real value with a tolerance of +/−30% defining the lower limit of under-tensioning of the chain and the upper limit of over-tensioning of the chain.

Naturally, the counting in the unit 24 takes place while the carrousel 10 is operating, and when the chain has reached its operating speed.

In practice, with whose fastening calipers for fastening them to the chain are spaced apart by 28 cm being driven by a chain at a speed of 1.14 meters per second (m/s), and with an inductive sensor for detecting undulations going past at about fifty centimeters in the longitudinal direction L from the point of disengagement from the pulley 16 and at about 2 centimeters off of the path T, 375 occurrences have been detected in 100 seconds. With a tolerance of 30%, if the number of detected undulations is less than 260, the chain is over-tensioned; if it lies in the range 260 to 485, the chain is correctly tensioned, and finally, if it is greater than 485, the chain is under-tensioned.

The counting period of 100 seconds corresponds in practice to the period necessary for the chain 13 to travel over at least one lap of the path T. Tests have shown that that period gives relatively reliable results.

FIG. 6 shows, in more detail, an example of mounting the contactless sensor 23 of the inductive type on a system of rails 12 of a bin carrousel of a mail handling machine.

More particularly, FIG. 6 is cross-section view of the drive chain 13 for driving a bin 11 with a set of guide rails 12a, 12b, 12c for guiding a roller system 29 supporting the bin 11. The rails 12a to 12c are channel-section rails and are disposed in such a manner that they face in different directions so as to form a 2-axis system for holding the roller system captive.

In FIG. 6, the rails 12a and 12b face downwards while the rail 12c faces perpendicularly to the rails 12a and 12b. FIG. 6 also shows, in cross-section, three rollers 29a, 29b, 29c of the roller system 29 which are mounted in the rails 12a to 12c. The rollers 29a to 29c are mounted on axles that are secured to a load-bearing structure of the bin 11, the suspension arm 14 fastened to the chain 13 via a caliper 15 or the like being part of said load-bearing structure. In addition, two other rollers (not shown) of the roller system 29 roll respectively in the same rails 12a, 12b as the rollers 29a and 29c.

The sensor 23 is mounted via a bracket 25 on the rail 12a that faces the chain 13. A double-headed arrow represents the zone Z in which undulations in the chain 13 form/move and which is situated under the sensor 23, i.e. in the detection zone of the sensor 23 and thus in the zone of emission of the magnetic field B;

Clearly, the invention is in no way limited to the details of the above-described embodiment, but rather it extends to any variant that is obvious to the person skilled in the art.

It is, for example, possible to dispose two contactless sensors such as 23 on either side of the path T for detecting undulations in the chain.

The invention claimed is:

1. A method of monitoring the tension of a continuous endless drive elongate member mounted to be moved over a closed-loop path and having a slack run along which it forms undulations, said method comprising the steps of:
    using a sensor on said closed-loop path to detect undulations going past in the slack run,
    counting the number of undulations detected by the sensor, and
    using said number of counted undulations as a magnitude for measuring the tension of the drive member.

2. A method according to claim 1, in which said step of using a sensor includes using a contactless sensor to detect undulations going past in the slack run.

3. A method according to claim 2, in which said step of using a sensor includes using an inductive sensor for detecting undulations going past in the slack run.

4. A method according to claim 2, in which said step of using a sensor includes using an optical sensor to detect undulations going past in the slack run.

5. A method according to claim 1, in which the drive member is a bin drive chain for driving bins in a mail handling machine.

6. A mail handling machine comprising:
    an endless roller drive chain having a slack run along which the chain forms undulations;
    a bin carrousel with bins that are driven to move around a closed-loop path via said endless roller drive chain; and
    a system configured to detect undulations going past in the slack run of the chain and to count the number of detected undulations for the purpose of monitoring the tension of the chain.

7. A machine according to claim 6, in which the system comprises a guide rail for guiding the bins and an inductive sensor placed on said guide rail for the purpose of detecting undulations going past in the slack run of the chain.

8. A machine according to claim 6, in which the system comprises a guide rail for guiding the bins and an optical sensor placed on said guide rail for the purpose of detecting undulations going past in the slack run of the chain.

9. A machine according to claim 6, in which the system further comprises a data-processing unit that compares the number of undulations counted over a given period of time with a reference value so as to deliver an alarm or adjustment control signal.

10. A machine according to claim 9, in which the data-processing unit is programmed to repeat the comparison operation cyclically.

* * * * *